(12) United States Patent
Desai et al.

(10) Patent No.: US 11,770,740 B2
(45) Date of Patent: Sep. 26, 2023

(54) AUTOMATIC CLASSIFICATION AND ENFORCEMENT OF LOW-BANDWIDTH INTERNET OF THINGS (IOT) DEVICES

(71) Applicant: Cisco Technology, Inc., San Jose, CA (US)

(72) Inventors: Vishal Satyendra Desai, San Jose, CA (US); Santosh Babaji Kulkarni, San Jose, CA (US); Young Il Choi, San Jose, CA (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 557 days.

(21) Appl. No.: 16/460,169

(22) Filed: Jul. 2, 2019

(65) Prior Publication Data
US 2021/0007014 A1      Jan. 7, 2021

(51) Int. Cl.
| | |
|---|---|
| *H04W 28/20* | (2009.01) |
| *H04L 67/12* | (2022.01) |
| *H04W 24/08* | (2009.01) |
| *H04W 88/08* | (2009.01) |
| *H04W 84/12* | (2009.01) |

(52) U.S. Cl.
CPC .............. *H04W 28/20* (2013.01); *H04L 67/12* (2013.01); *H04W 24/08* (2013.01); *H04W 84/12* (2013.01); *H04W 88/08* (2013.01)

(58) Field of Classification Search
CPC ...... H04L 67/12; H04W 24/08; H04W 28/20; H04W 48/12; H04W 4/70; H04W 72/0453; H04W 84/12; H04W 88/08
USPC ......................................................... 370/329
See application file for complete search history.

(56) References Cited

U.S. PATENT DOCUMENTS

| | | | |
|---|---|---|---|
| 10,111,206 B2 | 10/2018 | Desai et al. | |
| 2004/0125779 A1* | 7/2004 | Kelton ................ | H04W 72/12 370/347 |

(Continued)

FOREIGN PATENT DOCUMENTS

WO       WO-2017134626 A1      8/2017

OTHER PUBLICATIONS

Bhanderi, et al., "Machine Learning for Wireless Sensor Network: A Review, Challenges and Applications", Advance in Electronic and Electric Engineering. ISSN 2231-1297, vol. 4, No. 5 (2014), pp. 475-486, Research India Publications.

(Continued)

*Primary Examiner* — Christopher M Crutchfield
*Assistant Examiner* — Jean F Voltaire
(74) *Attorney, Agent, or Firm* — BEHMKE INNOVATION GROUP LLC; James M. Behmke; Jonathon P. Western

(57) ABSTRACT

In one embodiment, a technique for automatic classification and enforcement of low-bandwidth 20 MHz-only Internet of Things (IoT) devices is provided. An access point in communication with a plurality of devices may classify one or more client devices of the plurality as low-bandwidth or 20 MHz-only devices. The access point may allocate a subset of resource units (RUs) in a channel (e.g., a 20 MHz-wide channel) to the one or more client devices. The access point may then exchange data with the one or more client devices using the subset of RUs.

20 Claims, 7 Drawing Sheets

(56) References Cited

U.S. PATENT DOCUMENTS

| | | | | |
|---|---|---|---|---|
| 2010/0002610 | A1* | 1/2010 | Bowser | G06F 1/3209 713/323 |
| 2012/0108287 | A1* | 5/2012 | Hamel | H04W 24/02 455/517 |
| 2012/0155301 | A1* | 6/2012 | Miyazaki | H04L 43/00 370/252 |
| 2013/0339438 | A1* | 12/2013 | Cherian | H04W 4/08 709/204 |
| 2014/0016624 | A1* | 1/2014 | Zou | H04W 72/02 370/336 |
| 2014/0323087 | A1* | 10/2014 | Huang | H04W 12/06 455/435.2 |
| 2015/0282068 | A1* | 10/2015 | Rajagopal | H04L 27/2692 370/350 |
| 2017/0094621 | A1 | 3/2017 | Xu et al. | |
| 2018/0063841 | A1 | 3/2018 | Song et al. | |
| 2018/0270820 | A1 | 9/2018 | Gupta et al. | |
| 2019/0068350 | A1* | 2/2019 | Brown | H04L 5/0037 |
| 2020/0037337 | A1* | 1/2020 | Patwardhan | H04B 7/0452 |

OTHER PUBLICATIONS

Cao, et al., "Towards Optimal Sleep Scheduling in Sensor Networks for Rare-Event Detection", IPSN 2005. Fourth International Symposium on Information Processing in Sensor Networks, Apr. 2005, pp. 20-27, IEEE.

Coleman, David., "How Do 20 MHz-Only Clients Operate In 802.11ax?", Aerohive Blog, https://blog.aerohive.com/how-do-20-mhz-only-clients-operate-in-802-11ax/, 2 pages, Jun. 18, 2018, Aerohive Networks.

Ma, et al., "Energy Efficient TDMA Sleep Scheduling in Wireless Sensor Networks", IEEE Infocom, Apr. 2009, pp. 630-638, IEEE.

Miller, et al., "Improving the Energy Consumption of Sensor Network Wake-Up Protocols", SemanticScholar.org, Technical Report, Aug. 2004, 16 pages.

Samek, et al., "The Convergence of Machine Learning and Communications", arXiv:1708.08299v1, 8 pages, Aug. 28, 2017., arXiv.org.

Sendra, et al., "Power Saving and Energy Optimization Techniques for Wireless Sensor Networks", Journal of Communications, vol. 6, No. 6, Sep. 2011, pp. 439-459, Academy Publisher.

Sharma, et al., "Towards Massive Machine Type Communications in Ultra-Dense Cellular IoT Networks: Current Issues and Machine Learning-Assisted Solutions", IEEE Communications Surveys & Tutorials (Draft), arXiv:1808.02924v1, pp. 1-37, Aug. 8, 2018, arXiv.org.

Wang, et al., "Machine Learning for Networking: Workflow, Advances and Opportunities", IEEE Network—Accepted for publication, pp. 1-8, 2017, IEEE.

Vasseur, et al., "Securing Your Network with Anomaly Detection using Distributed Learning Architecture (Learning Networks)", 39 pages, Jan. 2017, Cisco.

* cited by examiner

AUTOMATIC CLASSIFICATION AND ENFORCEMENT OF LOW-BANDWIDTH INTERNET OF THINGS (IOT) DEVICES

TECHNICAL FIELD

The present disclosure relates generally to wireless communications, and, more particularly, to automatic classification and enforcement of low-bandwidth Internet of Things (IoT) devices, such as for 20 MHz-only stations in 802.11ax Networks.

BACKGROUND

Wireless networks are becoming increasingly ubiquitous, with many businesses, schools, and public areas now offering wireless connectivity to authorized users and to guests. With the increasing popularity of wireless networks, the number of different types of wireless clients and wireless protocols is also rapidly increasing. For examples, personal devices now include cellular phones, tablets, wearable devices (e.g., smart watches, head-mounted displays, etc.), while wireless protocol standards (e.g., 802.11ax, 802.11ay, etc.) are under continued development by groups like the Institute of Electrical and Electronics Engineers (IEEE).

Features have been introduced in the wireless protocol standards (e.g., for 802.11ax), including support for brownfield deployments where an access point may be associated with (and service) both high efficiency (HE) stations that require high-spectrum resources and low-bandwidth stations, such as Internet of Things (IoT), devices that require relatively fewer spectrum resources (e.g., 20 MHz-only stations, as defined in the 802.11ax standard). As wireless communication devices increasingly proliferate (e.g., IoT sensors, smartphones, tablet devices, etc.), brownfield deployments will appear more often, and efficiently allocating and optimally load balancing spectrum resources to associated stations when limited spectrum is available becomes of paramount importance.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
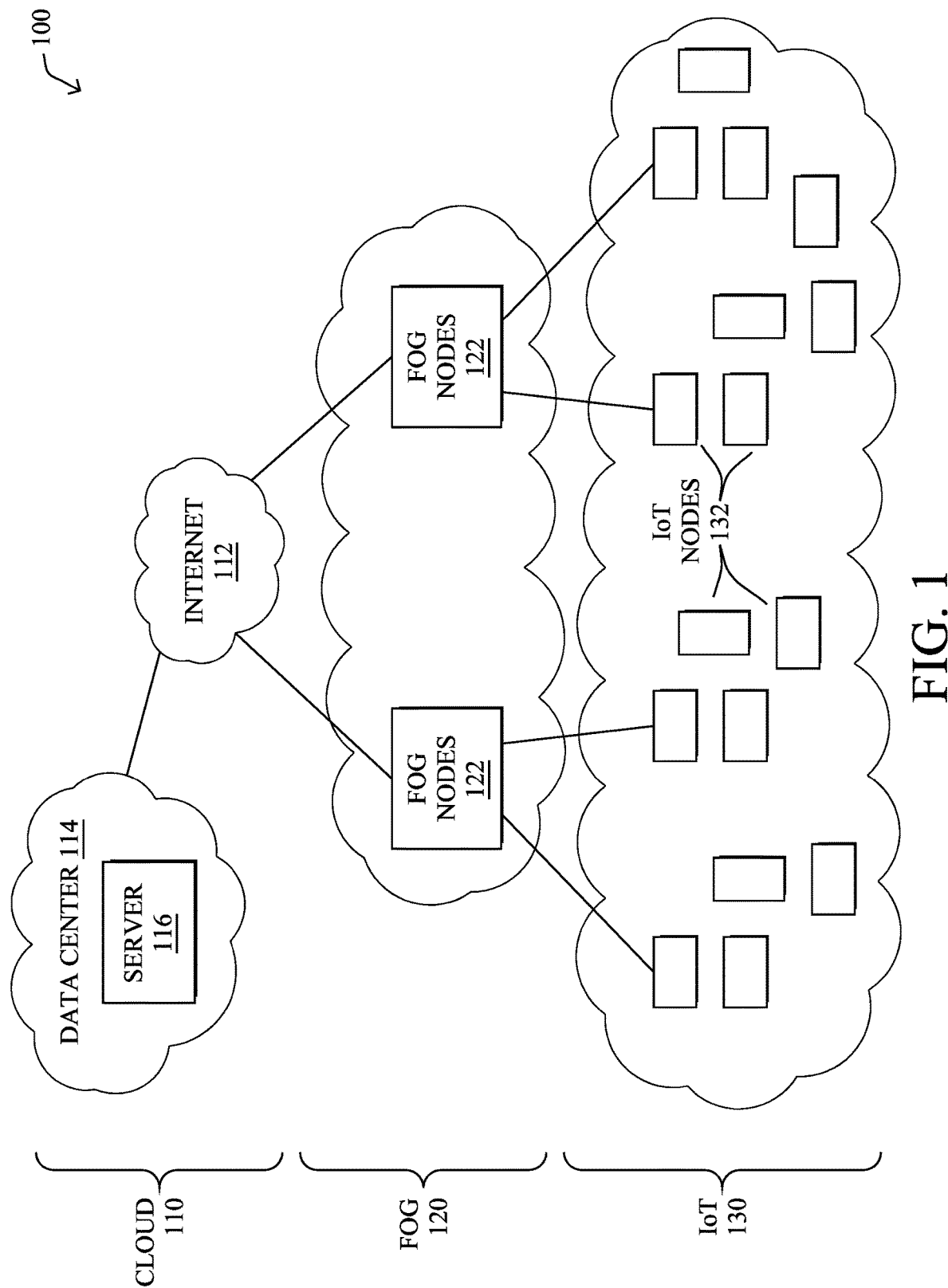
FIG. 1 illustrates an example communication network.

In one embodiment, a technique for automatic classification and enforcement of low-bandwidth (e.g., 20 MHz-only) Internet of Things (IoT) devices is provided. An access point in communication with a plurality of devices may classify one or more client devices of the plurality as low-bandwidth (e.g., 20 MHz-only) devices. The access point may allocate a subset of resource units (RUs) in a channel (e.g., a 20 MHz-wide channel) to the one or more client devices. The access point may then exchange data with the one or more client devices using the subset of RUs.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, high bit error rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or hierarchy of layers from local networks (e.g., IoT networks) to the cloud (e.g., centralized and/or shared resources, as will be understood by those skilled in the art). That is, generally, fog computing entails using devices at the network edge to provide application services, including computation, networking, and storage, in close proximity to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple peer-to-peer and hierarchical layers of fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
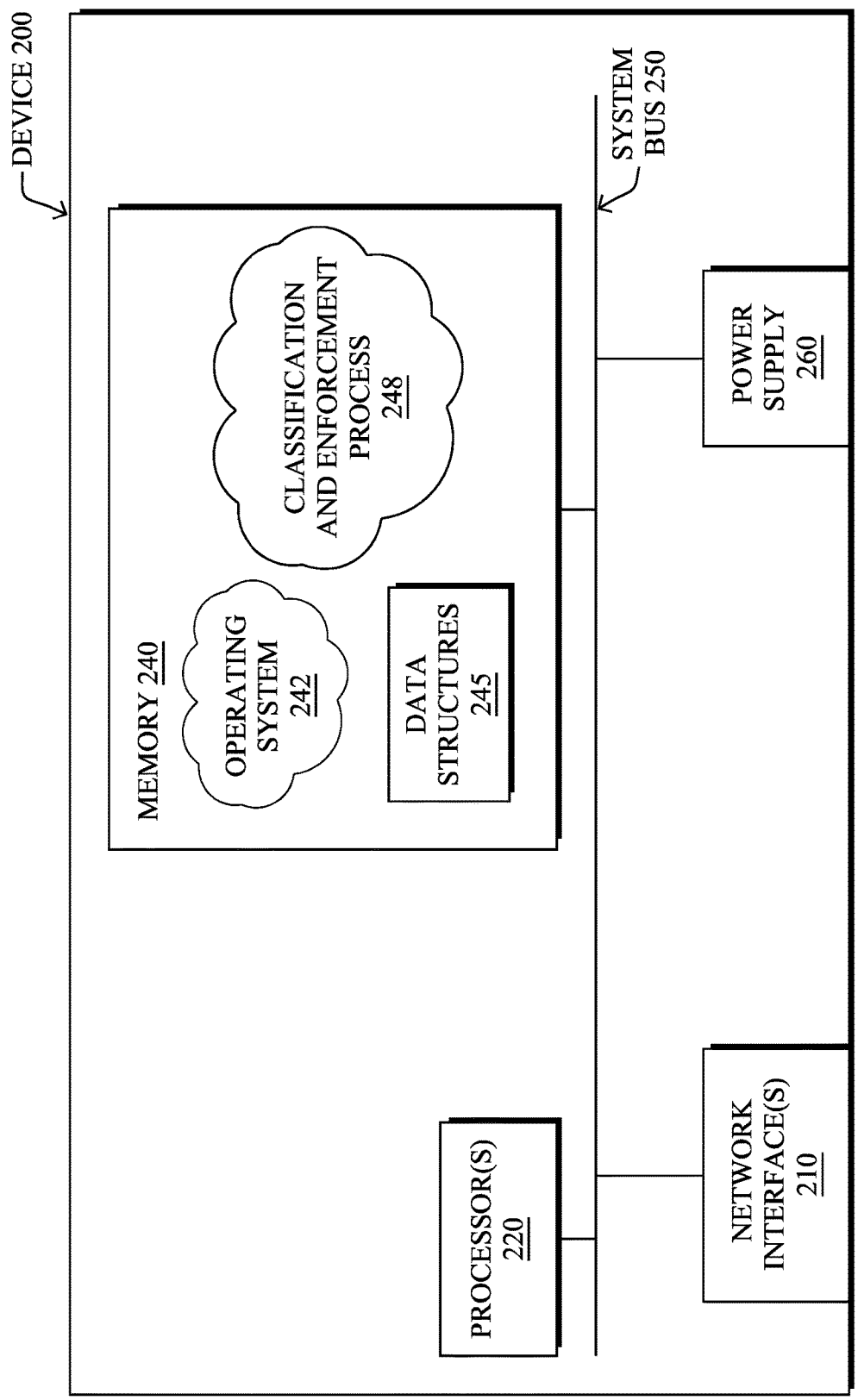
FIG. 2 illustrates an example network device/node.

FIG. 2 is a schematic block diagram of an example computing device/node (e.g., an apparatus) 200 that may be used with one or more embodiments described herein, e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, for example, wireless and wired/physical connections, and that the view herein is merely for illustration. Further, the network interface(s) 210 may include the antennas and/or radio components described herein above for wireless communications (e.g., according to one or more 802.11 communication standards).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative classification and enforcement process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Classification and Enforcement of Low-Bandwidth IoT Devices—

As noted above, features have been introduced in the wireless protocol standards (e.g., for 802.11ax), including support for brownfield deployments where an access point may be associated with (and service) both high-efficiency (HE) stations that require high spectrum resources and low-bandwidth or, in 802.11ax specifically, 20 MHz-only stations (e.g., IoT devices) that require relatively fewer spectrum resources. As wireless communication devices increasingly proliferate (e.g., IoT sensors, smartphones, tablet devices, etc.), brownfield deployments will appear more often. Some wireless communication devices, to maintain their association with an access point, may need to report device health, runtime statistics, or send keep-alive (e.g., heartbeat) messages. To efficiently allocate and optimally load balance spectrum resources to associated stations when limited spectrum is available, access points may need to discover and classify which of the associated stations require higher spectrum resources versus those that require fewer spectrum resources (e.g., low-powered and/or battery-operated devices).

Currently, the 802.11ax standard (e.g., 802.11ax Draft (3.0) Section 28.3.2.7 "20 MHz operating non-AP HE STAs") offers an enhancement called 20 MHz-only operational mode for 802.11ax clients. As described in the standard, client stations, via management frames, may inform an 802.11ax access point that the client stations are operating as 20 MHz-only clients (e.g., in either a 2.4 GHz or 5 GHz band). If a client station does not inform the 802.11ax access point that the client station is operating as a 20 MHz-only client, the 802.11ax access point may provide the same spectrum resources to the client station as other non-20 MHz-only clients, notwithstanding the true traffic requirements and channel capacity access needs of the client station. Thus, the 802.11ax access point may inefficiently allocate spectrum resources to the client station (e.g., when the client station is allocated high-efficiency (HE) resources but only requires low-bandwidth resources). Accordingly, considering limited spectrum availability and the large number of idle and/or low capacity-driven devices that have been introduced, there is a need for access points to efficiently detect and classify such low-bandwidth clients in wireless networks (e.g., 802.11ax networks).

The techniques herein, therefore, enable an automatic classification and enforcement of low bandwidth (e.g., 20-MHz-only) IoT devices by an access point. In particular, the techniques herein may work in conjunction with or separately from the 20 MHz-only operational mode described in the 802.11ax standard. Notably, once a wireless station (e.g., an IoT device) has been associated to an 802.11ax access point, a network controller may classify the wireless stations as a low-bandwidth or 20 MHz-only client device using various network parameters, where the network parameters are indicative of traffic trends of the client device. Using the classification of the client device, the 802.11ax access point may group the client device with other low-bandwidth or 20 MHz-only client devices that are associated to the 802.11ax access point. The 802.11ax access point may then allocate spectrum resources to the group of client devices that correspond to the resource requirements of the client device. To this end, the 802.11ax access point may allocate specific tones to the group or client device, assign specific radios operating on certain channel widths of the access point to the group or client device, etc. Additionally, the 802.11ax access point may steer the group or client device to a nearby basic service set (serviced by another access point) for load distribution and to further increase overall spectrum efficiency.

Specifically, according to one or more embodiments of the disclosure as described in detail below, an access point in communication with a plurality of devices may classify one or more client devices of the plurality as low-bandwidth devices (or, per the 802.11ax protocol, as 20 MHz-only devices). The access point may allocate a subset of resource units (RUs) in a channel (e.g., a 20 MHz-wide channel) to the one or more client devices. The access point may then exchange data with the one or more client devices using the subset of RUs.

Illustratively, the techniques described herein may be performed by hardware, software, and/or firmware, such as in accordance with the classification and enforcement process 248, which may include computer executable instructions executed by the processor 220 (or independent processor of interfaces 210) to perform functions relating to the techniques described herein, on either or both of the access point or the client devices, as detailed below.

Figure 3A:
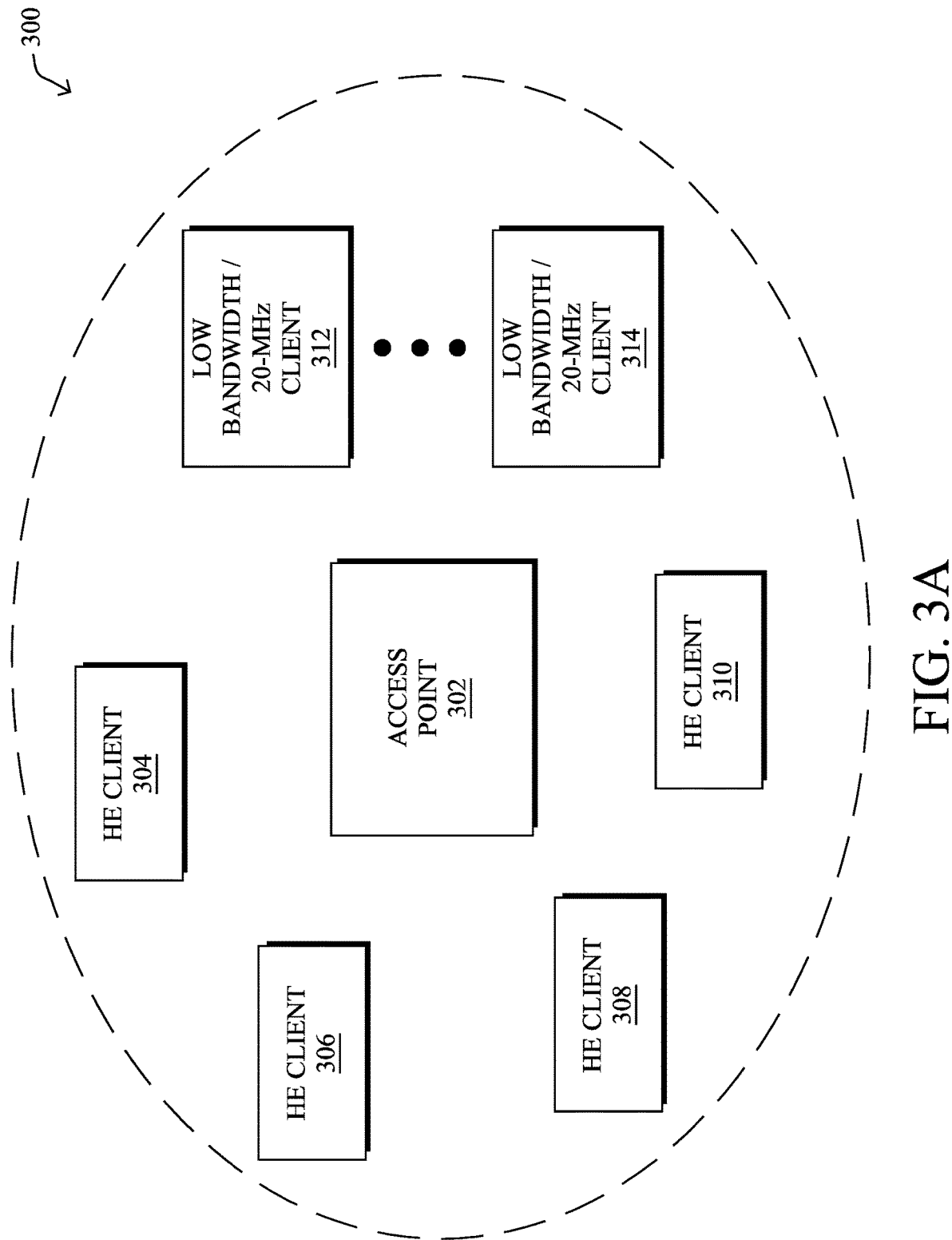
FIGS. 3A-3C illustrate a simplified example wireless network that implements classification and enforcement of low bandwidth (e.g., 20 MHz-only) Internet of Things (IoT) devices.
Figure 3B:
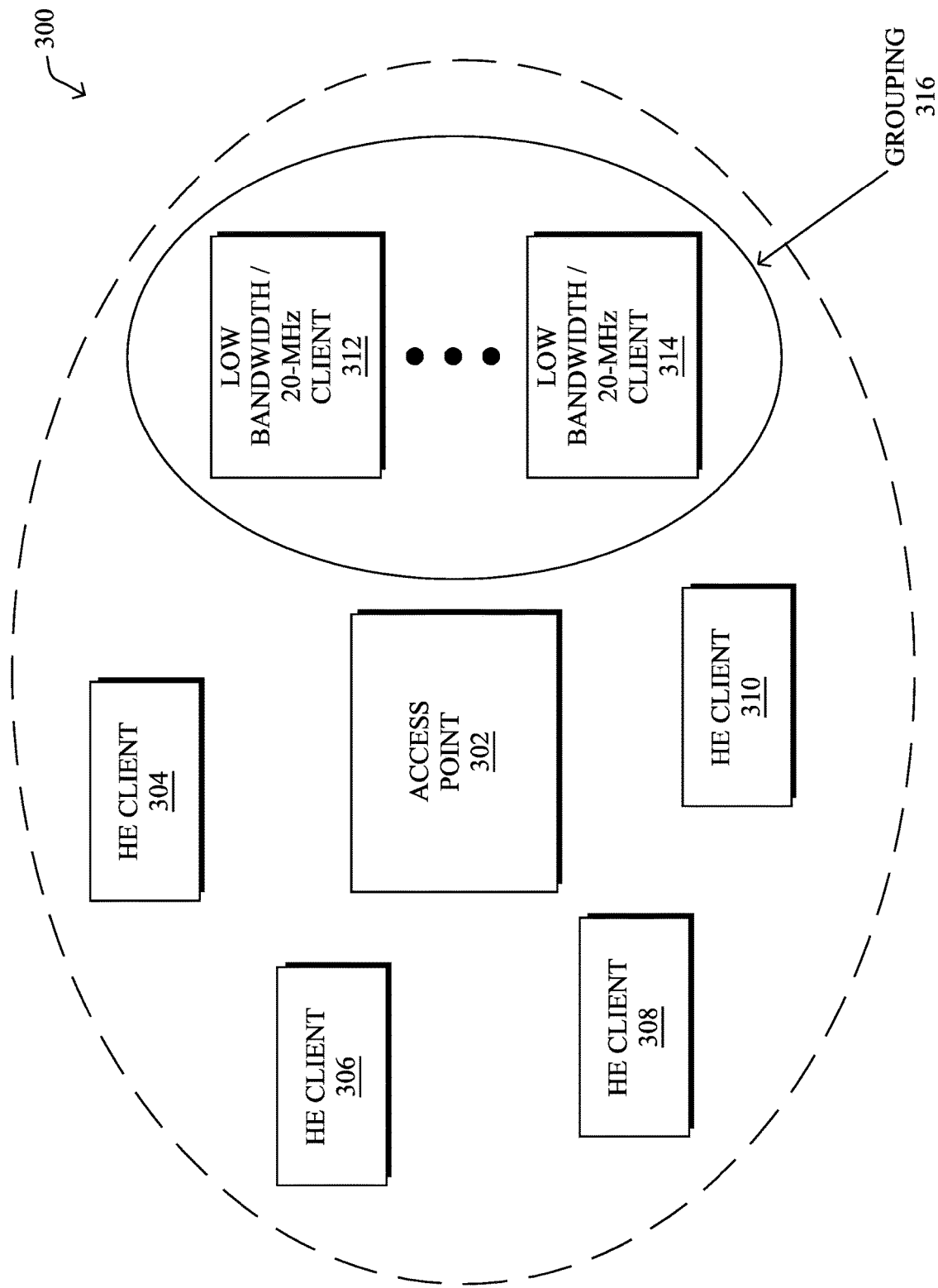
Figure 3C:
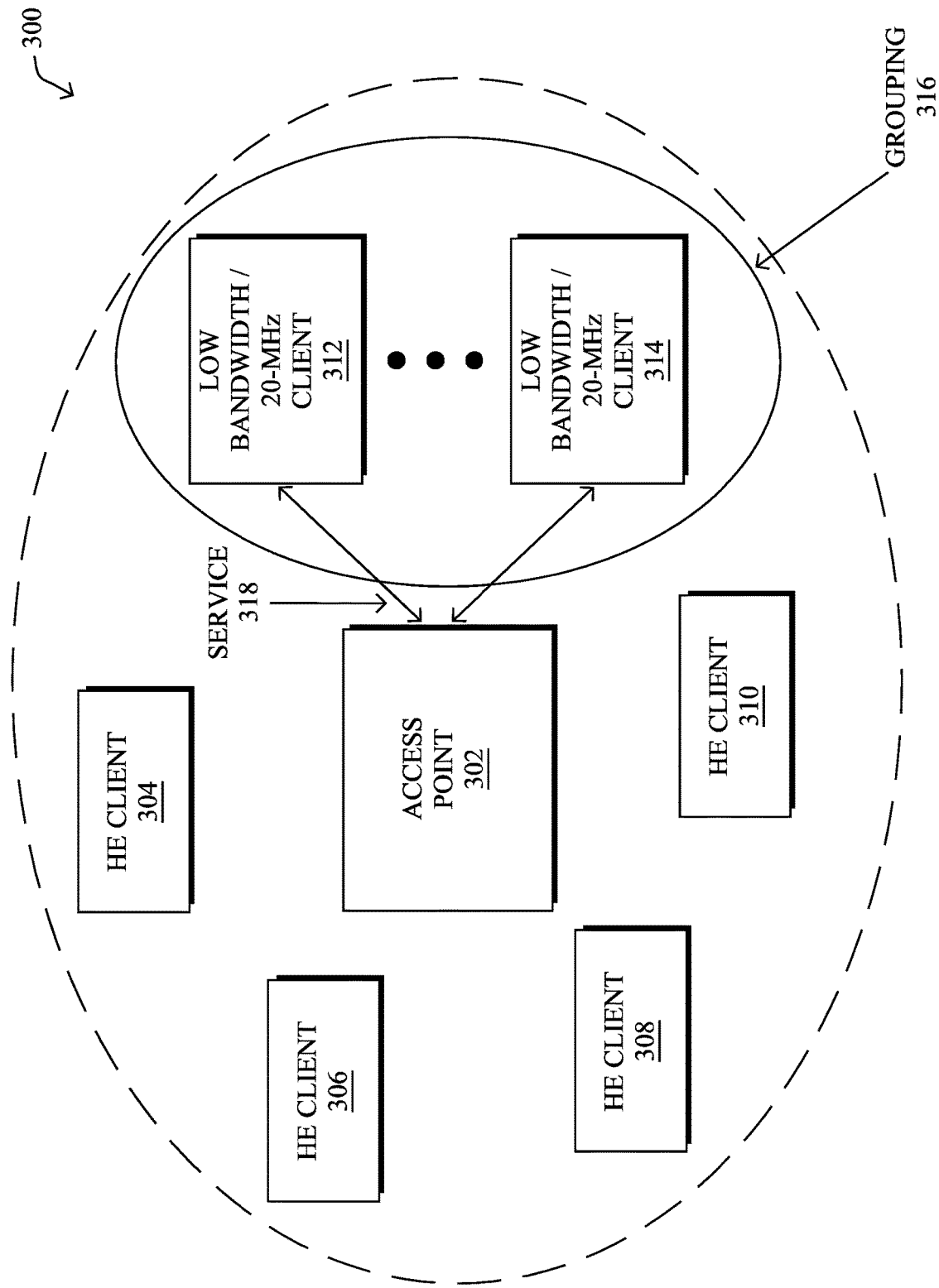

Operationally, consider the example wireless network 300 shown in FIGS. 3A-3C that includes an access point 302 that services a plurality of client devices (e.g., IoT devices, stations, etc.) 304-314. As shown in FIG. 3A, some of the client devices 304-314 may be high-efficiency (HE) client devices 304-310, while a plurality of client devices may be low-bandwidth or 20 MHz client devices 312-314. The access point 302 may communicate with the client devices 304-314 in accordance with IEEE 802.11 communication standards. In particular, the access point 302 and the client devices 304-314 may include one or more communications antennas. The one or more communications antennas may be any suitable type of antennas corresponding to, for example, the IEEE 802.11 communication standards. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component(s) to transmit and/or receive signals, such as communications signals among the access point 302 and the client devices 304-314.

In one embodiment, the access point 302 and the client devices 304-314 may be configured to perform directional transmission and/or directional reception in conjunction with wirelessly communicating in a wireless network. Such directional transmission and/or reception can be performed using a set of multiple antenna arrays (e.g., DMG antenna arrays or the like). Each of the multiple antenna arrays may be used for transmission and/or reception in a particular respective direction or range of directions. The access point 302 and the client devices 304-314 be configured to perform any given directional transmission a) towards one or more defined transmit sectors and/or b) from one or more defined receive sectors. Additionally, MIMO beamforming in the local network 300 may be accomplished using radio frequency (RF) beamforming and/or digital beamforming. In particular, the access point 302 and the client devices 304-314 may be configured to use all or a subset of its one or more communications antennas to perform MIMO beamforming.

The access point 302 and the client devices 304-314 may include any suitable radio component(s) for transmitting and/or receiving RF signals in a bandwidth and/or channel corresponding to the communications protocols utilized by the access point 302 and the client devices 304-314. The radio component(s) may include hardware and/or software to modulate and/or demodulate communications signals according to pre-established transmission protocols. The radio component(s) may further have hardware and/or software instructions to communicate via one or more IEEE 802.11 communication standards. For example, the radio component(s), in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). In another example, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component(s) may include any known receiver and baseband suitable for communicating via the communications protocols. Further, the radio component(s) may include a low noise amplifier (LNA), additional signal amplifiers, an analog-to-digital (A/D) converter, one or more buffers, digital baseband(s), switches, etc.

—Dynamic Low Bandwidth Device Classification

With reference now to FIG. 3B, the access point 302 may classify the plurality of low-bandwidth or 20 MHz-only client devices 312-314 into a grouping 316 of low-bandwidth or 20 MHz-only client devices. In particular, once a low-bandwidth or 20 MHz-only client device 312 has associated with the access point 302, a network controller (e.g., in communication with the access point 302, installed on the access point 302, etc.) may classify the low-bandwidth or 20 MHz-only client device 312 as a low-bandwidth IoT device using various network parameters.

It is to be understood that any of the plurality of low-bandwidth or 20 MHz-only client devices 312-314 may have advertised themselves as 20 MHz-only via management frames (according to the 802.11ax standard described above). However, in an embodiment, the low-bandwidth or 20 MHz-only client device 312 may be classified as a low-bandwidth IoT device based on an analysis of wireless traffic patterns of the client device 312. In particular, the access point 302 may determine whether its exchange of data with the client device 312 is aperiodic or contiguous. For example, low-bandwidth devices (e.g., IoT sensors) are expected exchange infrequent echo/heartbeat messages as a mechanism to maintain their association with access points. Similarly, passive wireless stations will also send periodic keep-alive control messages to maintain a client device's state with the access points. Based on these traffic patterns low-bandwidth/IoT devices, the access point 302 may distinguish the plurality of low-bandwidth or 20 MHz-only client devices 312-314 from the HE client devices 302-310 (e.g., capacity driven wireless stations) and group the plurality of low bandwidth or 20 MHz-only client devices 312-314 into the grouping 316.

In an embodiment, an application visibility control (AVC) mechanism may be leveraged to classify the plurality of low-bandwidth or 20 MHz-only client devices 312-314 into the grouping 316. Notably, the AVC mechanism may analyze source application triggering data traffic onto the access point 302. The AVC mechanism may implement state full deep packet inspection (DPI) to classify more the applications. DPI may be combined with techniques such as statistical classification, socket caching, service discovery, auto learning, and Domain Name System (DNS) as an Authoritative Source (DNS-AS) to classify the plurality of low-bandwidth or 20 MHz-only client devices 312-314 into the grouping 316. Custom applications may be configured to detect native applications.

In an embodiment, the low-bandwidth or 20 MHz-only client device 312 may be classified as a low-bandwidth IoT device based on an analysis of data traffic received from and or sent to the client device 312. The access point 302 may implement stream classification and directional analysis of the stream to determine access needs of the client device 312. For example, the access point 302 may differentiate devices that originate "bursty" traffic (e.g., data reports, device health status updates, etc.) from devices that sends contiguous traffic (e.g., a video stream). In this example, the access point 302 may omit classifying devices that send contiguous streams of data requiring higher capacity as low-bandwidth devices. Furthermore, the access point 302 may analyze devices with "bursty" traffic characteristics by validating a directionality of the "bursty" traffic (e.g., percentage of traffic that is downlink versus percentage of traffic that is uplink). For example, when a majority of the traffic is initiated by the client device 312 (e.g., uplink), then the access point 302 may query the client device to identify a type of traffic the client device 312 has queued to transmit (e.g., the access point 302 may send a buffer status report poll (BSRP) trigger frame). The access point 302 may, based on a plurality of these queries that indicate, determine to classify the client device 312 as a low-bandwidth IoT device.

In an embodiment, the low-bandwidth or 20 MHz-only client device 312 may be classified as a low-bandwidth IoT device based on an analysis of an access priority of the client device 312. In particular, the access point 302 may determine QoS profile of the client device 312 based on quality of service (QoS) parameters, including Differentiated Services Code Point (DSCP), user priority, Enhanced Distributed Channel Access (EDCA), etc. The access point 302 may combine with data rates (supported and actual transmit and/or receive) of the client devices 312 to determine, for example, whether the client device 312 can be managed by a low bandwidth radio on the access point 302 and whether a subset of resource units would satisfy the spectrum resource requirements of the client device 312.

In an embodiment, the low-bandwidth or 20 MHz-only client device 312 may be classified as a low bandwidth IoT device based on an analysis of power saving capabilities of the client device 312. The power saving capabilities of the client device 312 may be based on a current traffic classification and a device type (of the client device 312). For example, the access point 302 may, when the client device 312 is exchanging unicast or broadcast traffic, validate a negotiated target wake time (TWT) schedule to determine how frequently the client device 312 is exchanging data with the access point 312 and a sleeping cycle of the client device 312. If the client device 312 is a non-HE (e.g., legacy) and/or does exchange multicast traffic then request polls (e.g., 802.11v Directed Multicast Service (DMS) request polls) are analyzed to check the client device's (312's) downlink multicast to unicast poll frequency and inter-DMS request delta.

It is to be understood that that any of the above-described analyses used to classify client device 312 as a low-bandwidth IoT device may be used in combination or independently of one another. Further, once the access point 302 groups the plurality of low-bandwidth or 20 MHz-only client devices 312-314 as the grouping 316, the access point 302 may append the grouping to an existing list of 20 MHz-only client devices (e.g., stations that have advertised their capabilities and/or requirements based on the management frames according to the 802.11ax standard described above).

—Device Load Distribution

Turning now to FIG. 3C, after determining the grouping 316, the access point 302 may allocate a spectrum resources to the grouping 316 to provide service 318 to the plurality of low-bandwidth or 20 MHz-only client devices 312-314. In particular, the access point 302 may assign a subset of resource units (RUs) to the grouping 316 to enable communication with multiple IoT devices. The RUs may be, for example, 26-tone RUs used by the plurality of low-bandwidth or 20 MHz-only client devices 312-314 to communicate at the same time. In situations where the access point 302 is transmitting on a standard 20 MHz-wide channel, the plurality of low-bandwidth or 20 MHz-only client devices 312-314 will be able to support tone mappings of a 26-tone RU, 52-tone RU, 106-tone RU, and 242-tone RU within the 20 MHz-wide channel. In a similar manner, radios operating on wider channel widths, for example, 40 MHz, 80 MHz, 160 MHz or 80 MHz+80 MHz may support several low-bandwidth IoT devices simultaneously.

After the determining the grouping 316, the access point 302 may send an operating mode notification to the plurality of low-bandwidth or 20 MHz-only client devices 312-314

(of the grouping 316). The operating mode notification may indicate an offer to serve reduced bandwidth on the 20 MHz-wide channel by the access point 302 to the client devices 312-314. The plurality of low-bandwidth or 20 MHz-only client devices 312-314 (of the grouping 316) may send indication that acknowledges service at the reduced bandwidth on the 20 MHz-wide channel. By reducing the channel width provided to the plurality of low-bandwidth or 20 MHz-only client devices 312-314, the access point 302 may provide additional spectrum to the HE client devices 304-310 (e.g., 802.11ac, 802.11ax, 802.11n, etc.) to meet their capacity needs.

Additionally, in an embodiment, the access point 302 may steer the plurality of low-bandwidth or 20 MHz-only client devices 312-314 to one or more radios of the access point, wherein the one or more radios operate on the 20 MHz channel or with average channel quality. For example, standardized steering mechanisms, such as 802.11v BSS Transition Management Request, Channel Switch Announcement, etc. may be leveraged to offer load balancing among the client devices 312-314 of the grouping 316. These trigger mechanisms can steer devices requiring low-bandwidth to one or more radios operating either on lower channel widths or with average channel quality (as long as a signal-to-noise ratio (SNR) of these devices does not degrade). Alternatively, the access point 302 may assign the plurality of low-bandwidth or 20 MHz-only client devices 312-314 to nearby available 2.4 GHz radios (that operate in the 20 MHz channel) of a neighboring access point (e.g., by using an 802.11k Dual-Band Neighbor-List).

In an embodiment where the access point 302 belongs to a localized neighborhood (e.g. an RF neighborhood) and a density of the client devices 304-314 is greater than a number of access points of the localized neighborhood, the access point 302 may offer anchoring ability to the plurality of low-bandwidth or 20 MHz-only client devices 312-314. In particular, an access point (e.g., the access point 302) of the localized neighborhood may have at least one radio advertise a 20 MHz service set identifier (SSID) legacy complementary code keying (CCK), orthogonal frequency division multiplexing (OFDM), etc. rates or dynamically enabling at least one radio on the 20 MHz wide channel to provide the service 318. The access point (e.g., the access point 302) of the localized neighborhood may alternatively dynamically enable at least one radio on the 20 MHz-wide channel that provides the service 318, where the at least one radio enables a separate IoT-designed radio on the narrower bandwidth.

Figure 4:
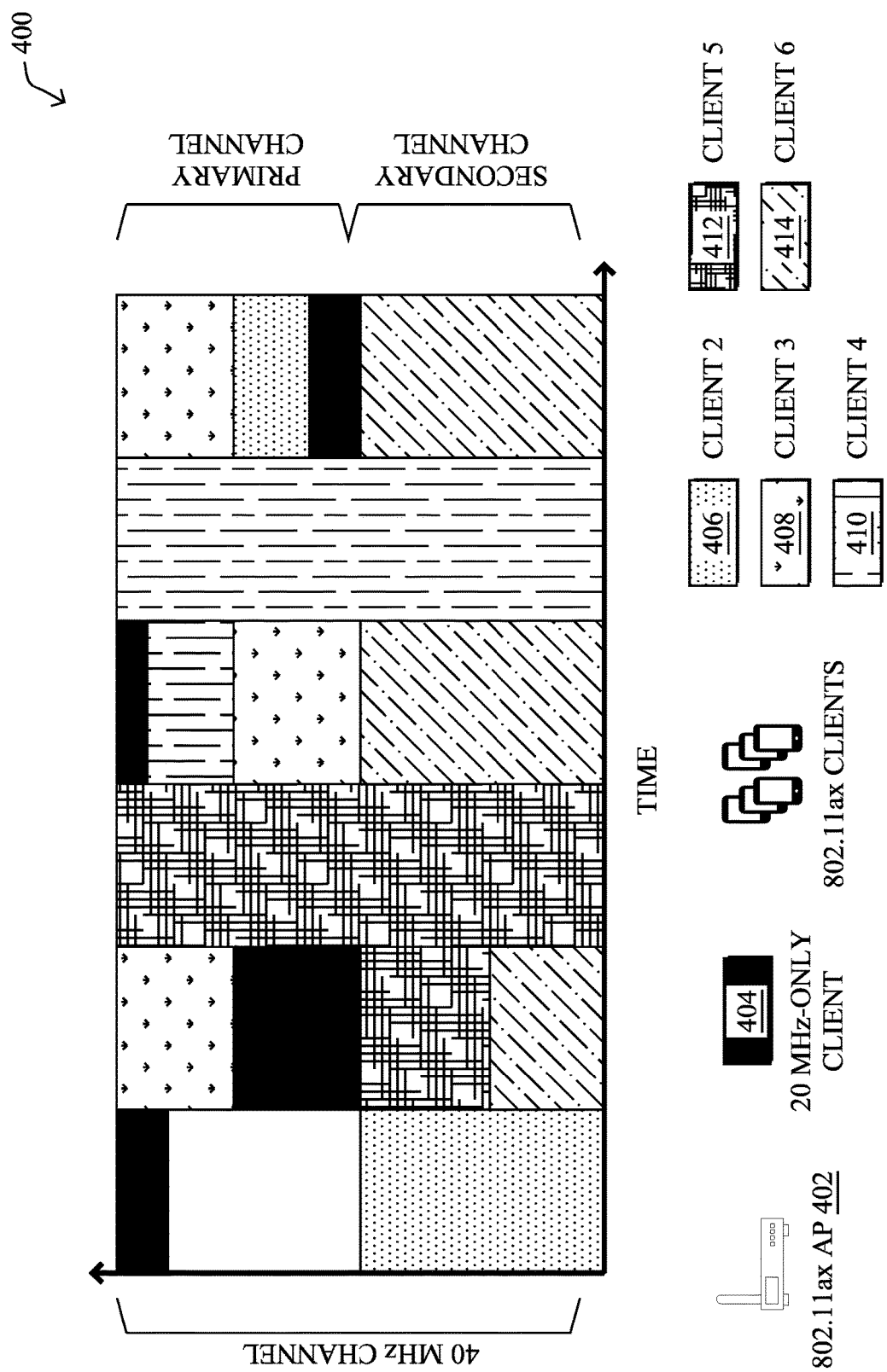
FIG. 4 illustrates a resource allocation scheme for low bandwidth (e.g., 20 MHz-only) client devices and high efficiency (HE) client devices.

With reference now to FIG. 4, a resource allocation scheme 400 for low-bandwidth or 20 MHz-only client devices and HE client devices is shown. In particular, an access point 402 may provide allocate resources for a 40 MHz-wide channel. As shown, after determining that one or more 20 MHz-only clients 404 are associated with the access point 402, the access point 402 may assign resources to the one or more 20 MHz-only clients 404 in solely a 20 MHz-wide primary channel of the 40 MHz-wide channel. Resources may simultaneously be assigned to HE clients 406-414 (e.g., 802.11ax clients) that span the entire 40 MHz-wide channel, including the 20 MHz-wide primary channel and a 20 MHz-wide secondary channel.

Figure 5:
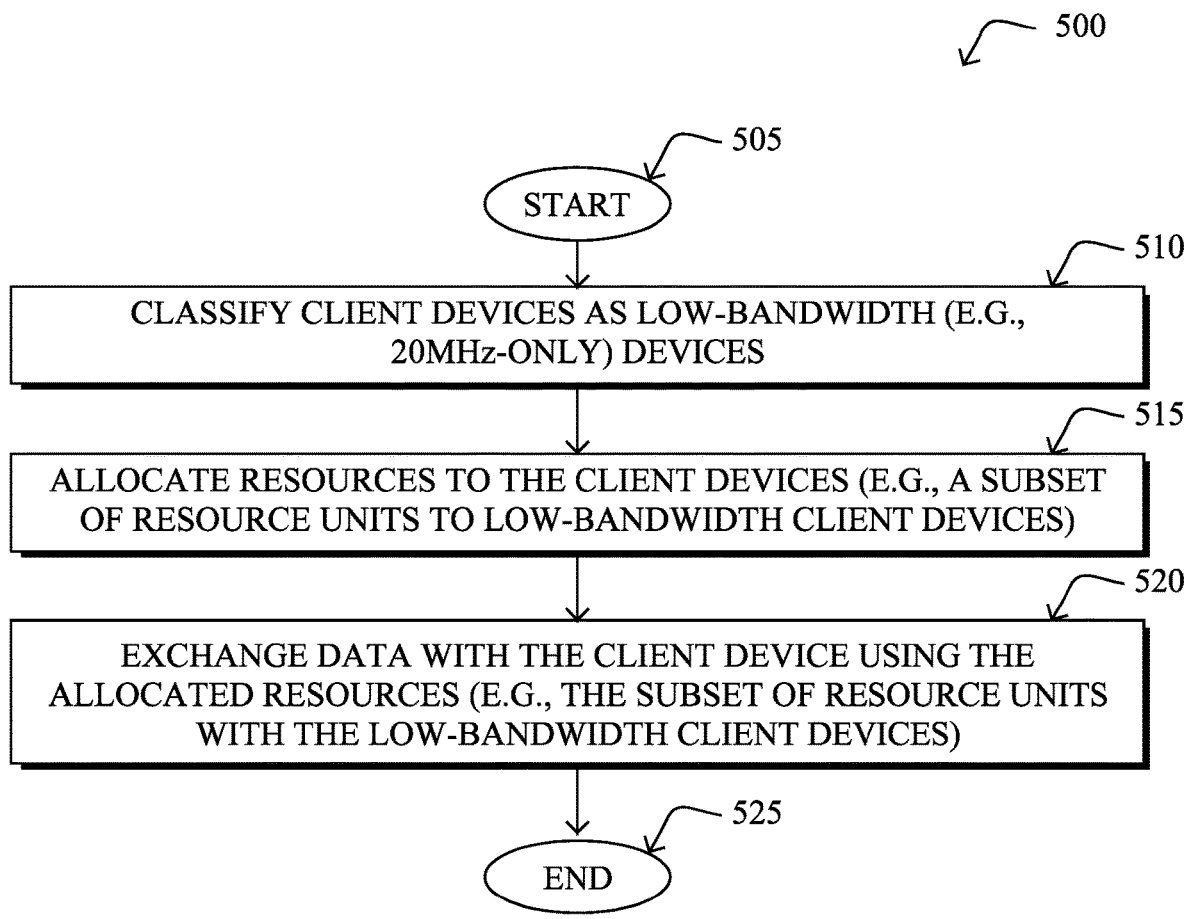
FIG. 5 illustrates an example simplified procedure for classification and enforcement of low-bandwidth (e.g., 20 MHz-only) Internet of Things (IoT) devices.

FIG. 5 illustrates an example simplified procedure for classification and enforcement of low-bandwidth (e.g., 20 MHz-only) IoT devices in accordance with one or more embodiments described herein. For example, a non-generic, specifically configured device (e.g., device 200, an apparatus, etc.) may perform procedure 500 by executing stored instructions (e.g., process 248). The procedure may start at step 505, and continues to step 510, where, as described in greater detail above, an access point may classify a client device as a low-bandwidth device or, more specifically in one embodiment, a 20 MHz-only device. In particular, an access point in communication with a plurality of client devices may classify one or more client devices of the plurality as low-bandwidth or 20 MHz-only devices. Classifying the one or more client devices of the plurality as low-bandwidth or 20 MHz-only devices may comprise analyzing traffic trends of the one or more client devices. The access point may illustratively comprise an 802.11ax access point, though other suitable access points may be used, accordingly.

The access point may group the classified one or more client devices as a grouping of low-bandwidth or 20 MHz-only devices. Further the access point may append the one or more client devices to a list of 20 MHz-only stations that have advertised capabilities and requirements using management frames (according to the 802.11ax standard). Additionally, the access point may send an operating mode notification to the one or more client devices, the operating mode notification indicating an offer to serve reduced bandwidth on the 20 MHz-wide channel by the access point may then receive an indication from the one or more client devices, the indication acknowledging service at the reduced bandwidth on the 20 MHz-wide channel.

In step 515, the access point may allocate resources to the client device. In particular, the access point may allocate a subset of RUs in a channel (e.g., a 20 MHz-wide channel) to the one or more client devices. For example, the access point may allocate resources in a primary channel that is only 20 MHz wide, while allocating resources to HE client devices that span the primary channel and a secondary channel that is also 20 MHz wide.

In step 520, the access point may exchange data with the client devices using the allocated resources. In particular, the access point may exchange data with the one or more client devices using the subset of RUs. Further, the access point may steer the one or more client devices to one or more radios of the access point, wherein the one or more radios operate on the 20 MHz channel or with average channel quality. Alternatively, the access point may assign the one or more client devices to one or more radios of at least one other access point using a neighbor list. The access point may also offer anchoring ability with an access point of a localized neighborhood to the one or more client devices, wherein the anchoring ability is offered by the access point having at least one radio advertise a 20 MHz SSID or dynamically enabling at least one radio on the 20 MHz-wide channel.

The simplified example procedure 500 then ends at step 525.

It should be noted that certain steps within procedure 500 may be optional as described above, and the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for automatic classification and enforcement of low-bandwidth or 20 MHz-only IoT devices. In some aspects, an access point may classify an IoT device (e.g., wireless station) as a low-bandwidth or 20 MHz-only client device using various network parameters, where the network parameters are indicative of traffic trends of the IoT device. Using the classification of the IoT device, the access point may group the IoT device with other low-bandwidth or 20 MHz-only client devices that are associated to the access point. The access point may then allocate spectrum resources to the group of client devices that correspond to the actual resource requirements of the client devices (including the IoT device). For appropriate load distribution and to further increase overall spectrum efficiency, the access point may steer the group or IoT device to a nearby basic service set (serviced by another access point).

While there have been shown and described illustrative embodiments that provide for automatic classification and enforcement of low-bandwidth or 20 MHz-only IoT devices, it is to be understood that various other adaptations and modifications may be made within the scope of the embodiments herein. In addition, while certain protocols are shown, like 802.11ax, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true scope of the embodiments herein.

What is claimed is:

1. A method, comprising:
    classifying, by an access point in communication with a plurality of client devices, one or more client devices of the plurality of client devices as low-bandwidth devices, the plurality of client devices comprising at least one client device not classified by the access point as a low-bandwidth device, wherein a first set of the one or more client devices is classified as low-bandwidth devices based on an advertisement made by the first set of the one or more client devices, and a second set of the one or more client devices is classified as low-bandwidth devices based on a traffic pattern of the second set of the one or more client devices;
    allocating, by the access point, a subset of resource units (RUs) in a channel to the one or more client devices classified as low-bandwidth devices; and
    exchanging, by the access point, data with the one or more client devices classified as low-bandwidth devices using the subset of RUs.

2. The method of claim 1, further comprising:
    sending, by the access point, an operating mode notification to the plurality of client devices, the operating mode notification indicating an offer to serve reduced bandwidth on the channel by the access point; and
    receiving, by the access point, an indication from the one or more client devices classified as low-bandwidth devices, the indication acknowledging service at the reduced bandwidth on the channel.

3. The method of claim 1, wherein classifying the one or more client devices of the plurality of client devices as low-bandwidth devices comprises:
    analyzing, by the access point, traffic trends of at least the one or more client devices classified as low-bandwidth devices.

4. The method of claim 1, wherein classifying the one or more client devices of the plurality of client devices as low-bandwidth devices comprises:
    appending, by the access point, the one or more client devices classified as low-bandwidth devices to a list of 20 MHz-only stations that have advertised capabilities and requirements using management frames.

5. The method of claim 1, further comprising:
    steering, by the access point, the one or more client devices classified as low-bandwidth devices to one or more radios of the access point, wherein the one or more radios operate on a 20 MHz channel or with average channel quality.

6. The method of claim 1, further comprising:
    assigning, by the access point, the one or more client devices classified as low-bandwidth devices to one or more radios of at least one other access point using a neighbor list.

7. The method of claim 1, further comprising:
    offering, by the access point, anchoring ability with an access point of a localized neighborhood to the one or more client devices classified as low-bandwidth devices.

8. The method of claim 7, wherein the anchoring ability is offered by the access point having at least one radio advertise a 20 MHz service set identifier (SSID) or dynamically enabling at least one radio on a 20 MHz-wide channel.

9. The method of claim 1, wherein the access point comprises an 802.11ax access point.

10. The method of claim 1, wherein low-bandwidth devices are 20 MHz-only devices, and wherein the channel is a 20 MHz-wide channel.

11. An apparatus, comprising:
    one or more network interfaces to communicate with a network, the networking including a plurality of client devices;
    a processor coupled to the network interfaces and configured to execute one or more processes; and
    a memory configured to store a process executable by the processor, the process, when executed, is configured to:
        classify one or more client devices of the plurality of client devices as low-bandwidth devices, the plurality of client devices comprising at least one client device not classified by the apparatus as a low-bandwidth device wherein a first set of the one or more client devices is classified as low-bandwidth devices based on an advertisement made by the first set of the one or more client devices, and a second set of the one or more client devices is classified as low-bandwidth devices based on a traffic pattern of the second set of the one or more client devices;
        allocate a subset of resource units (RUs) in a channel to the one or more client devices classified as low-bandwidth devices; and
        exchange data with the one or more client devices classified as low-bandwidth devices using the subset of RUs.

12. The apparatus as in claim 11, wherein the process, when executed, is further configured to:
    send an operating mode notification to the plurality of client devices, the operating mode notification indicating an offer to serve reduced bandwidth on the channel by an access point; and receive an indication from the one or more client devices classified as low-bandwidth devices, the indication acknowledging service at the reduced bandwidth on the channel.

13. The apparatus as in claim 11, wherein to classify the one or more client devices of the plurality of client devices as low-bandwidth devices comprises:
analyzing traffic trends of at least the one or more client devices classified as low-bandwidth devices.

14. The apparatus as in claim 11, wherein to classify the one or more client devices of the plurality of client devices as low-bandwidth devices comprises:
appending the one or more client devices classified as low-bandwidth devices to a list of 20 MHz-only stations that have advertised capabilities and requirements using management frames.

15. The apparatus as in claim 11, wherein the process, when executed, is further configured to:
steer the one or more client devices classified as low-bandwidth devices to one or more radios of an access point, wherein the one or more radios operate on a 20 MHz channel or with average channel quality.

16. The apparatus as in claim 11, wherein the process, when executed, is further configured to:
assign the one or more client devices classified as low-bandwidth devices to one or more radios of at least one other access point using a neighbor list.

17. The apparatus as in claim 11, wherein the process, when executed, is further configured to:
offer anchoring ability with an access point of a localized neighborhood to the one or more client devices classified as low-bandwidth devices.

18. The apparatus as in claim 17, wherein the anchoring ability is offered by an access point having at least one radio advertise a 20 MHz service set identifier (SSID) or dynamically enabling at least one radio on a 20 MHz-wide channel.

19. The apparatus as in claim 11, wherein the apparatus comprises an 802.11ax access point, wherein low-bandwidth devices are 20 MHz-only devices, and wherein the channel is a 20 MHz-wide channel.

20. A tangible, non-transitory, computer-readable medium storing program instructions that cause an access point in communication with a plurality of client devices to execute a process comprising:
classifying one or more client devices of the plurality of client devices as low-bandwidth devices, the plurality of client devices comprising at least one client device not classified by the access point as a low-bandwidth device, wherein a first set of the one or more client devices is classified as low-bandwidth devices based on an advertisement made by the first set of the one or more client devices, and a second set of the one or more client devices is classified as low-bandwidth devices based on a traffic pattern of the second set of the one or more client devices;
allocating a subset of resource units (RUs) in a channel to the one or more client devices classified as low-bandwidth devices; and
exchanging data with the one or more client devices classified as low-bandwidth devices using the subset of RUs.

* * * * *